United States Patent [19]

Kautt

[11] Patent Number: 4,934,043
[45] Date of Patent: Jun. 19, 1990

[54] ASSEMBLING DEVICE OF THE DIFFERENT PARTS OF METAL FITTINGS

[75] Inventor: Jean-Jacques Kautt, Strasbourg, France

[73] Assignee: Ferco International, Sarrebourg, France

[21] Appl. No.: 165,091

[22] Filed: Mar. 7, 1988

[30] Foreign Application Priority Data

Mar. 12, 1987 [FR] France .................. 87 03598

[51] Int. Cl.⁵ .............................................. B23P 19/00
[52] U.S. Cl. ........................................ 29/796; 29/818; 29/823
[58] Field of Search ............. 29/783, 791, 795, 796, 29/818, 822, 823, 430, 434, 524.1, 526.2; 198/403, 456, 457, 602, 636

[56] References Cited

U.S. PATENT DOCUMENTS

| | | | |
|---|---|---|---|
| 1,397,020 | 11/1921 | Smith | 29/783 X |
| 1,911,624 | 5/1933 | Kuklenski | 29/791 |
| 2,602,562 | 7/1952 | Bresciani | 29/715 |
| 2,778,474 | 1/1957 | Koning | 198/456 X |
| 3,077,660 | 2/1963 | Essenberg | 29/786 X |
| 3,533,519 | 10/1970 | Anderson | 198/457 R |
| 3,766,626 | 10/1973 | Mjos et al. | 29/783 X |
| 3,781,967 | 1/1974 | Fisher | 29/783 X |
| 3,809,208 | 5/1974 | Shields | 198/602 X |
| 3,832,432 | 8/1974 | Perry | 29/783 X |
| 3,863,471 | 2/1975 | Keller-Volper | 70/462 X |
| 4,069,910 | 1/1978 | Faley et al. | 198/456 |
| 4,518,178 | 5/1985 | Bengtsson | 70/370 X |
| 4,697,385 | 10/1987 | Zachariasen | 49/193 X |

FOREIGN PATENT DOCUMENTS 3412441 10/1985 Fed. Rep. of Germany .
3508459 9/1986 Fed. Rep. of Germany .
2589933 5/1987 France .

OTHER PUBLICATIONS

Patent Abstracts of Japan, vol. 6, No. 190 (M-159)(1068), Sep. 29, 1982; & JP-A-57 96 744 (Sanyou Kikou K.K.), 16-06-1982.

Primary Examiner—Mark Rosenbaum
Assistant Examiner—Frances Chin
Attorney, Agent, or Firm—Sandler, Greenblum & Bernstein

[57] ABSTRACT

An assembly device for assembling various parts onto an elongate body. A transporter has a plurality of conveyors to deliver the elongate body to a plurality of stations for the attachment of various parts. After all the parts have been attached to the elongate body, the elongate body is removed from the assembly device.

7 Claims, 1 Drawing Sheet

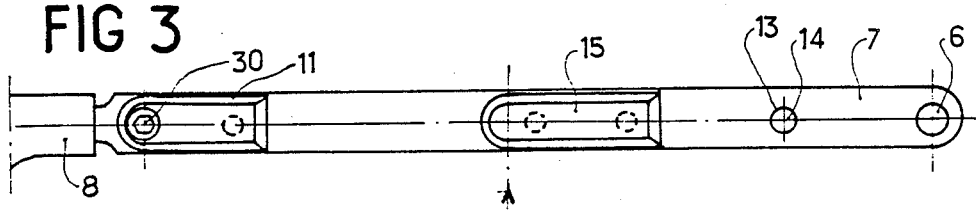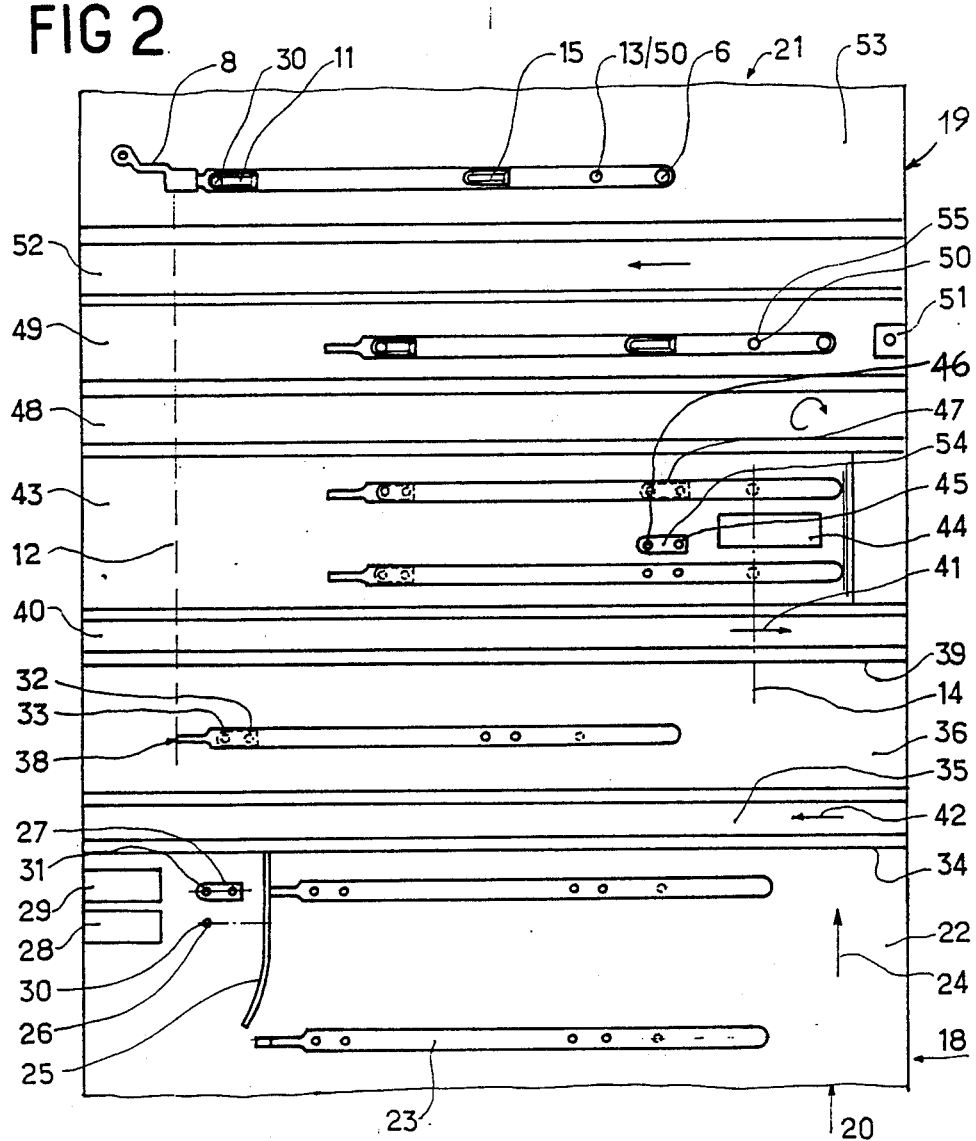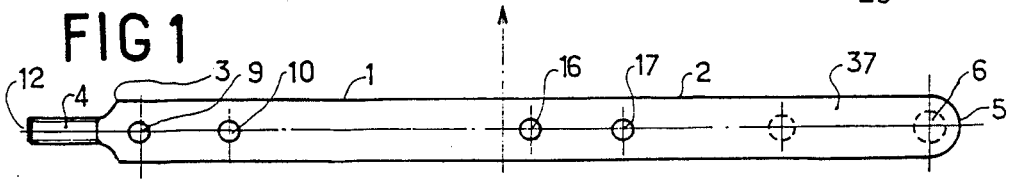

ASSEMBLING DEVICE OF THE DIFFERENT PARTS OF METAL FITTINGS

BACKGROUND OF THE INVENTION

1. Field of the Invention

The invention refers to a device V for assembling different parts of a metal fitting, such as a compass leg, consisting of a longitudinal body provided with a rotation pin fitted with an O-ring, a pivot screwed onto a threaded shaft located at one of the ends of the longitudinal body and two locking members riveted onto the longitudinal body.

2. The Prior Art

Transfer installations intended for the accurate machining of very long elements, such as tubes are known in the prior art. These installation a loading device which lays the tubes one by one onto a first means of cross displacement, placing one of the tube ends in front of a first cutting device. By means of a transfer device, the tube is then placed onto a second means of cross displacement which moves it in the reverse cross direction with respect to its first displacement in order to place the other tube end in front of a second cutting device. When the two ends are cut off, the tube is positioned in front of a third cutting device located in the middle plane of the installation, in such a way that the two tube sections obtained have exactly the same length. After this central cutting, each tube section is dealt with individually to bring each end of each tube section successively in contact with the machine tools which carry out either deburring or chamfering or other similar machining operations.

However, the part of the installation located upstream of the central cutting device has to be stopped until the two tube sections coming out of the central cutting device are put away. As a consequence, the progress rates upstream and downstream of the central cutting device are different, whereas they should be uniform in order to achieve the highest possible operation efficiency.

It is also known in the prior art to have an assembling installation for different parts of metal fittings, such as espagnolette bolts for windows or doors, or similar metal fittings, in which the fittings are laid down at regular intervals onto a stepwise transporter, and which comprises, for each part to be assembled, at least one assembling station laid-out according to a reference plane of the metal fitting. The stepwise transporter comprises feeding means consisting of a conveyor on which the longitudinal plane of the metal fitting sets to be assembled lies perpendicular to the feeding line of the conveyor.

These prior art feeding means, in which the width of the metal fitting is at least equal to the sum of the greatest possible length of the metal fitting and of the lengths of the cross travels, are combined with cross displacement means located between two assembly stations or two sets of assembling units and provide for the bidirectional displacment of the metal fittings in the horizontal plane each travel being determined according to the reference plane of the metal fitting. This reference plane coincides with the median plane of the metal fitting, such as the median plane of the espagnolette casing, of which the conventional components are essentially the different elements of the casing such as the core, pinion, return pinion, assembling bushings and rivets, and the like, as well as the bits and guides near the casing.

This installation, which operates at a constant rate from the inlet down to the outlet, takes only one reference plane into account, i.e. the median plane of the casing.

But many metal fittings, in particular compass legs, have no casing and consequently the compass leg cannot be positioned according to the reference plane of the casing.

Moreover, the assembling process of the different parts of the compass leg must take into account the position of the pivot around which the moving leg turns and the position of the rotation axis of the rod connecting the compass leg integral with the stationary element to the head part integral with the moving leg.

SUMMARY OF THE INVENTION

The purpose of this invention is to supply an assembling device enabling the combination of the advantages resulting from a constant rate of stepwise feeding of the compass legs during the assembling of the different parts and the advantages of changing the cross position of the compass leg according to the position of the parts, which is independent of the length of the compass leg.

To this effect, the invention refers to an assembling device for different parts of a metal fitting, such as a compass leg having a longitudinal body equipped with a rotation pin fitted with an O-ring, a pivot screwed onto a threaded shaft provided at one end the longitudinal body, and two locking members which are riveted onto the longitudinal body, comprising, in combination, at least one assembly station for the assembling of the pivot and the two locking members, a stepwise transporter consisting of at least one conveyor on which the longitudinal axis of the compass leg lays perpendicular to the feeding axis of the transporter, cross displacement means of the compass leg which positions the leg with respect to two guiding planes perpendicular to the longitudinal axis, these cross travel means co-operating with the transporter for moving the compass leg in two opposite cross directions, assembling stations, storage facilities, machining stations and a turning-over device directing the back face of the longituddinal body upwards after positioning of the locking members in order to fasten them onto the longitudinal body in the machining posts.

According to an advantage of the invention, one of the guiding planes consists of the side face of the threaded shaft provided at one of the ends of the compass leg and on which the pivot is screwed, so as to provide for the rotation of a door, window or similar pivoting frame.

According to another advantage of the invention, another guide plane passes through the centerline of the articulation of the secondary arm connecting the pivoting frame to the fixed frame of the door, window or the like.

The advantages derived from this invention lie mainly in the fact that it becomes possible to replace the manual assembling of the various parts on the compass leg by an automatic assembling process using a mechanized device, independently of the length of the compass leg.

THE DRAWINGS

The invention will more easily be understood by refering to the following description of a preferred embodiment, as illustrated in the accompanying drawings:

FIG. 1 is a view from below a compass leg before its entry into an assembling device;

FIG. 2 is a schematic plan view of the assembling device according to the present invention; and FIG. 3 is a plan view of compass leg fitted with the different assembled parts at the outlet of the assembling device.

DESCRIPTION OF THE PREFERRED EMBODIMENTS

A compass leg 1, of a preferred embodiment shown in FIGS. 1 and 3 enables the opening of a door, window or similar pivoting frame. The compass leg 1 comprises a longitudinal body 2 of which end 3 is provided with a threaded shaft 4 and which presents at its other end 5 an articulation which protrudes out of face 7 of the compass leg 1, this face 7 being considered as the back face of the leg.

A pivot 8 is screwed onto the threaded shaft 4, which enables the rotation of the pivoting frame with respect to the door, window or any similar fixed frame. A articulation 6 provides for the connection of the compass leg 1 integral with the fixed frame to the head piece integral with the door, window or similar pivoting frame, this head piece being for this purpose provided with a groove in which the articulation 6 can move lengthwise.

The compass leg 1, which is an elongated body has at its end 3 a first pair of apertures 9, 10 intended for receiving a first locking member 11, in which a locking element will slide while it protrudes through an opening provided in the head plate. The first locking member 11 is driven by a drive link rod of an espagnolette or an espagnolette lock.

The position of the first locking member 11 is fixed with respect to the end 3 of the compass leg. Consequently, side face 12 of the threaded shaft makes up one of the guiding planes enabling the positioning of the compass leg 1.

Moreover, the compass leg 1 has at a certain distance from its end 5 a rotation pin 13 which also protrudes out of the face 7. One bored end of a secondary arm which connects the fixed frame, window or similar to the pivoting frame is slipped onto this rotation pin 13 and limits the opening of the pivoting frame. Center 14 of the rotation pin 13 constitutes a second guiding plane for the positioning of the compass leg 1 in view of fastening a second locking member 15 providing for a sliding of a second locking element of the link rod of the espagnolette or espagnolette lock.

To this effect, the compass leg 1 comprises a second pair of apertures 16, 17 enabling the positioning of the second locking member 15.

Assembling device 18, shown in FIG. 2, comprises a transporter 19 extending from inlet 20 of the installation to outlet 21. This stepwise transporter 19 presents at its inlet 20 a first longitudinal conveyor 22 on which the compass legs 1, whose configuration is that of FIG. 1, are laid down. The longitudinal axis 23 of the compass legs are perpendicular to feeding line 24 of the first longitudinal conveyor 22.

The first longitudinal conveyor 22 is made up of a positioning guide 25 against which the side face 12 of the threaded shaft 4 of the compass lag 1 comes and stops. The compass leg 1, travelling in the direction of the feeding line 24, is thus positioned according to a first guide plkane made up of the side face 12. The first longitudinal conveyor 22 is comprises a first assembly station 26 and a second assembly station 27. Each assembly station 26, 27 has a storage facility 28, 29 respectively.

An eccentric 30 (FIG. 3), used to adjust the angular position of the first locking member 11 with respect to the body 2 of the compass leg 1, is taken out from the first storage facility 28. The eccentric 30 comprises an upward pointing pin. After a one-step feeding, the pin engages itself through an aperture 31 provided in the first locking member 11 taken from the second storage facility 29. The first locking member 11 presents a second pin 32, which is identical to the pin 33 of the eccentric 30.

At outlet 34 of the first longitudinal conveyor 22, the compass let 1 is transferred onto a first cross conveyor 35, while the first locking member 11 is sent towards a second longitudinal conveyor 36. The first cross conveyor 35 brings the compass leg 1 towards the positioning guide 25 in such a way that the apertures 9, 10 position themselves above the pins 32, 33. The first locking member 11 is lifted so that the pins 32, 33 protrude out of face 37, which is opposite the back face 7.

After the above steps have been performed, the set formed by the compass leg 1 and the first locking member 11 fitted with the eccentric 30 is brought in front of a first machining station 38, where the pins 32, 33 are riveted. This operation fastens the first locking member 11 to the back face 7 of the body 2 of the compass leg 1.

After leaving outlet 39 of the second longitudinal conveyor 36, the compass leg 1 fitted with its first locking member 11 is laid down onto a second cross conveyor 40, which moves in a direction 41 that is opposite to direction 42 of the first user conveyor 35.

The compass leg is positioned according to a second guide plane consisting of the center 14 of the rotation pin 13 in view of its trnasfer onto a third longitudinal conveyor 43, on which the second locking member 15 is fastened onto the compass leg 1 at a third assembling station 54. This second locking member 15, taken from a storage facility 44, has two pins 45, 46. The compass leg 1 is positioned in such a way that the second pair of apertures 16, 17 lie above the pins 45, 46. The second locking member is lifted so that the pins 45, 46 protrude out of the face 37 of the body 2 of the compass leg 1.

After that, the set formed by the compass leg 1 and the locking members 11, 15 are brought in front of a second machining post 47, which is a second machining station where the pins 45, 46 are riveted in order to fasten the second locking member 15 onto the body 2 of the compass leg 1.

Using an appropriate device 48 the compass leg 1 is turned over in such a way that the back face 7 of the body 2, equipped with the two locking members 11, 15, articulation 6 and rotation pin 13 becomes the top face.

After this turning over, the compass leg 1 is transferred onto a fourth longitudinal conveyor 49 for the fitting of an O-ring 50 obtained from storage facility 51. The O-ring 50 is fitted onto the rotation pin 13 by means of a fourth assembling station 55.

The compass leg 1 is then transferred onto a fifth longitudinal conveyor 53 by a third cross conveyor 52, in such a way that the side face 12 returns to the position it occupied on the second longitudinal conveyor 36, in order to enable the screwing of the pivot 8 onto the threaded shaft 4 of the compass leg 1. Where pivot 8 is threaded onto shaft 4 is a third machining station. When the pivot 8 is in place, the compass leg 1 fitted with all its accessories is removed from the outlet 21 of the assembling device 18 using any appropriate means.

What is claimed is:

1. An assembly apparatus, for assembling various fittings onto an elongated body, said assembly apparatus comprising:

an elongated body having a back, a face, a first end and a second end;

first means for positioning said elongated body at a first station proximate a first guide plane, said first end of said elongated body being proximate said first guide plane;

first means for attaching a first locking member to said face of said elongaged body proximate said first end of said elongated body;

second means for positioning said elongated body at a second station proximate a second guide plane, said second end of said elongated body being proximate said second guide plane;

second means for attaching a second locking member to said face of said elongated body proximate said second end of said elongated body;

third means for positioning said elongated body at a third station, said first end of said elongated body being positioned proximate said first guide plane so as to engage a pivot located proximate said first guide plane; and means for removing said elongated body from said assembly apparatus after the fittings have been placed on said elongated body.

2. The device of claim 1, further including means for attaching an O-ring to a rotation pin on said elongated body, said rotation pin extending orthogonally from said back of said elongated body proximate said second end of said elongated body.

3. The device of claim 1, wherein said positioning means comprises a conveyer that selectively transports said elongated body in a longitudinal direction from one location to another location.

4. The device of claim 1, wherein a cross-conveyer moves said elongated body from a location proximate said first guide plane to a location proximate said second guide plane.

5. The device of claim 1, wherein said first locking member is secured to said elongated body at said first station and said second locking member is secured to said elongated body at said second station.

6. The device of claim 1, wherein said first and second locking members are attached to said elongated body with rivets.

7. An assembly device for assembling metal fittings onto an elongated body, said assembly device comprising:

a first conveyer for longitudinally transporting said elongated body to a first assembly station, said elongated body having a first end, a second end, a face and a back, said elongated body being positioned on said conveyer such that said elongated body is substantially perpendicular to said longitudinal movement of said first conveyer, said first assembly station having a first and secnd storage facility, a first locking member being removed from said first storage facility and placed on an angular position eccentric located proximate a first guide plane, a locking pin being removed from said second storage facility and placed through an aperture in said first locking member;

means for transferring said first locking member to a first machining station associated with a second longitudinal conveyer;

first means for cross-conveying said elongated body so that an aperture proximate said first side of said elongated body is positioned proximate said first guide plane, said elongated body being transferred from said cross-conveyer means to said second longitudinal conveyer for delivery to said first machining station, said aperture in said elongated body being positioned over said locking pin and said first machining station riveting said locking pin so as to secure said first locking member to said elongated body;

second means for cross-conveying said elongated body so that said second end of said elongated body is proximate a second guide plane;

a third conveyyer for longitudinally transporting said elongated body to an asembly station associated with said third conveyer, said assembly station having a second locking member, said elongated body being positioned on said second locking member such that a locking pin associated with said second locking member is aligned with an aperture located proximate said second end of said elongated body, said third conveyer transporting said elongated body to a machining post associated with said third conveyer for riveting said locking pin associated with said second locking member so as to secure said second locking member to said elongated body;

means for turning over said elongated body;

a fourth conveyer for longitudinally conveying said elongated body to an O-ring station for placing an O-ring on a rotation pin orthogonally extending from said back of said elongated body proximate said second end of said elongated body;

third means for cross-conveying said elongated body so that said first end of said elongated body is proximate said first guide plane;

a fifth conveyer for longitudinally transporting said elongated body to a pivot, said pivot being secured to said first end of said elongated body; and means for removing said elongated body from said fifth conveyer.

* * * * *